US008875685B2

(12) United States Patent
McNeil

(10) Patent No.: US 8,875,685 B2
(45) Date of Patent: Nov. 4, 2014

(54) COMBUSTION METHOD AND APPARATUS

(75) Inventor: John McNeil, Meopham (GB)

(73) Assignee: Aquafuel Research Limited (GB)

( * ) Notice: Subject to any disclaimer, the term of this patent is extended or adjusted under 35 U.S.C. 154(b) by 228 days.

(21) Appl. No.: 12/736,196

(22) PCT Filed: Mar. 19, 2009

(86) PCT No.: PCT/EP2009/053274
§ 371 (c)(1),
(2), (4) Date: Nov. 30, 2010

(87) PCT Pub. No.: WO2009/115589
PCT Pub. Date: Sep. 24, 2009

(65) Prior Publication Data
US 2011/0088395 A1 Apr. 21, 2011

(30) Foreign Application Priority Data
Mar. 20, 2008 (EP) .................................... 08102837

(51) Int. Cl.
*F02M 31/04* (2006.01)
*F02D 19/06* (2006.01)
*C10L 1/02* (2006.01)
*F02D 19/08* (2006.01)
*F02D 41/00* (2006.01)
*F02B 3/06* (2006.01)
*F02M 37/00* (2006.01)

(52) U.S. Cl.
CPC ........ *F02D 41/0025* (2013.01); *F02D 19/0649* (2013.01); *F02D 19/0647* (2013.01); *Y02T 10/126* (2013.01); *Y02E 20/14* (2013.01); *Y02E 50/13* (2013.01); *F02M 31/042* (2013.01); *Y02T 50/678* (2013.01); *C10L 1/026* (2013.01); *F02D 19/081* (2013.01); *Y02T 10/16* (2013.01); *F02B 3/06* (2013.01); *F02M 37/0064* (2013.01); *Y02T 10/36* (2013.01)
USPC ........................................................ 123/543

(58) Field of Classification Search
CPC ......... F02M 31/08; F02M 1/00; F02M 31/02; F02M 31/045; F02M 31/042; F02B 1/12; F02B 1/14
USPC ............ 123/1 A, 557, 543, 554, 555; 60/320, 60/616
See application file for complete search history.

(56) References Cited

U.S. PATENT DOCUMENTS

| 3,186,394 | A | * | 6/1965 | Ramun ......................... 123/522 |
| 3,794,007 | A | | 2/1974 | Hardenberg et al. |
| 4,122,679 | A | | 10/1978 | Charron |
| 4,333,424 | A | | 6/1982 | McFee |
| 4,548,186 | A | | 10/1985 | Yamaji et al. |
| 4,709,672 | A | | 12/1987 | Ishida |
| 4,746,326 | A | | 5/1988 | Yan |
| 4,791,787 | A | * | 12/1988 | Paul et al. ..................... 60/605.1 |
| 4,876,988 | A | * | 10/1989 | Paul et al. ..................... 123/1 A |
| 5,101,801 | A | | 4/1992 | Schatz |
| 5,117,800 | A | * | 6/1992 | Watson et al. ................ 123/575 |
| 5,269,144 | A | | 12/1993 | Miller et al. |
| 5,662,090 | A | | 9/1997 | Ward |
| 7,047,933 | B2 | | 5/2006 | Gray, Jr. |
| 7,284,506 | B1 | | 10/2007 | Sun et al. |
| 2003/0052041 | A1 | | 3/2003 | Erwin et al. |
| 2003/0154933 | A1 | | 8/2003 | Glew |
| 2004/0231650 | A1 | | 11/2004 | Gray, Jr. |
| 2007/0062497 | A1 | * | 3/2007 | Joppig et al. .................. 123/556 |
| 2007/0157911 | A1 | | 7/2007 | Richardson |
| 2007/0221163 | A1 | | 9/2007 | Kamio |
| 2008/0305445 | A1 | * | 12/2008 | Roberts et al. .................... 431/9 |

FOREIGN PATENT DOCUMENTS

| CN | 2045782 | | 10/1989 |
| DE | 3833803 | A1 | 4/1990 |
| DE | 19622601 | C1 | 3/1998 |
| EP | 0234318 | B1 | 9/1990 |
| FR | 2876418 | | 4/2006 |
| GB | 1118906 | | 7/1968 |
| GB | 2130301 | A | 5/1984 |
| JP | 61008456 | | 1/1986 |
| JP | 3279663 | | 12/1991 |
| JP | 10205398 | | 8/1998 |
| WO | WO85/02194 | | 5/1985 |
| WO | WO90/04100 | | 4/1990 |
| WO | WO95/26467 | | 10/1995 |
| WO | WO98/25012 | | 6/1998 |
| WO | WO01/86136 | A1 | 11/2001 |
| WO | WO 2006086814 | A2 * | 8/2006 |
| WO | WO2007/059396 | A2 | 5/2007 |

OTHER PUBLICATIONS

Material Safety Data Sheet (MSDS), Glycerine, Aug. 2, 2000, Fisher Scientific.*

(Continued)

*Primary Examiner* — Lindsay Low
*Assistant Examiner* — Jacob Amick
(74) *Attorney, Agent, or Firm* — Egan, Peterman & Enders LLP.

(57) ABSTRACT

A method of combusting a very low cetane number material comprises injecting said material into a combustion cylinder of a heterogeneous-charge compression-ignition engine and supplying to the cylinder inlet port supplying the chamber combustion air or working fluid at a temperature substantially above ambient for substantially the entire time that the engine is running. Other aspects of the invention provide a compression ignition engine for use in the method, and method of using the engine to combust fuels.

11 Claims, No Drawings

(56) References Cited

OTHER PUBLICATIONS

Metzger, Brian; Glycerol Combustion, Nov. 6, 2007 (Published), Aug. 1, 2007 (Submitted), North Carolina State University.*

Search Report, PCT/EP2009/053274, Aug. 25, 2009, 4 pgs.

Kallio et al., "Effect of Low Cetane Fuel on Diesel Engine Performance 2-Combustion Performance of a Detroit Diesel 3-71 Engine", Society of Automotive Engineers, Inc., 1985, 8 pgs.

Ozkan et al., "Experimental Performance Analysis of Biodiesel, Traditional Diesel and Biodiesel With Glycerine", Turkish J. Eng. Env. Sci., 2005, 6 pgs.

Murphy et al., "Compendium of Experimental Cetane Number Data", National Renewable Energy Laboratory, Sep. 2004, 51 pgs.

Whyte et al., "Effect of Low Cetane Fuels on Diesel Engine Operation: 1-Preliminary Runs on Detroit Diesel 3-71 Engine", Society of Automotive Engineers, Inc., 1982, 8 pgs.

Williams, "Engine Performance", SAE Journal (Transactions), vol. 53, No. 5, 1944, 2 pgs.

Stenhede, International Seminar on Gasification, "Wartsila Green Solutions—Running Large Engines on Alternative Fuels", Oct. 9, 2008, 10 pgs.

Pagliaro et al., "From Glycerol to Value-Added Products", Angew. Chem. Int. Ed. 2007, 7 pgs.

Voirol et al., "Glycerol Derivatives for Diesel Fuel Reformulation", Society of Automotive Engineers, Inc., 2005, 10 pgs.

Davies et al., "Effects of Low Cetane Fuels on Diesel Engine Operation—Part 3—Performance of the 1990 Fuel in a Cummins NTX 400", Society of Automotive Engineers, Inc., 1988, 12 jpgs.

Crua, "Combustion Processes in a Diesel Engine", Ph.D. Thesis, University of Brighton, Dec. 2002, 20 pgs.

Partial Translation of WO2006/086814, taken from pp. 13 and 14, Feb. 16, 2006, 2 pgs.

Translation of WO2006/086814, Feb. 16, 2006, 15 pgs.

Introduction to Chemistry of Diesel Fuels, C. Song Section 2.1, Chapter 1, 2000, 1 pg.

Alam et al., "Effects of Inlet Air Temperature on Performance and Emissions of a Direct Injection Diesel Engine Operated With Ultra Low Sulfur Diesel Fuel", Proceedings of the International Conference on Mechanical Engineering, 2005, 6 pgs.

http://www.wartsila.com/en/about/company-management/overview, 2pgs; printed from Internet on Apr. 17, 2014.

* cited by examiner

COMBUSTION METHOD AND APPARATUS

This application claims priority to European Patent Application EP 08102837.5 filed on Mar. 20, 2008.

BACKGROUND a. Field of the Invention

The present invention relates to a method of combustion, notably combustion in a heterogeneous-charge compression-ignition internal combustion engine, and to an engine for use in the method.

b. Related Art

The term "diesel engine" is used herein to refer to a compression ignition internal combustion engine in which compression initiates combustion when fuel is injected. A heterogeneous charge of fuel and air ignites in a combustion chamber because of the heat generated in the rapid compression process. This differs from Otto-cycle engines, wherein fuel and air are mixed together before being ignited by a spark plug.

A diesel engine differs from a Homogeneous Charge Compression Ignition (HCCI) engine, which uses compression ignition but with pre-mixing of fuel and air to produce a homogeneous charge. When the fuel/air mixture is compressed sufficiently it ignites spontaneously. HCCI is suitable for lean burn operation and hence can have higher efficiency than a conventional Otto-cycle engine, and lower peak temperatures which reduces NOx formation. However, HCCI is more difficult to control than combustion in conventional engines, which can cause timing problems. In contrast to a diesel engine, where ignition is controlled by the time when fuel is injected into the compressed air, or an Otto-cycle engine, where ignition is controlled by the time when a spark is generated, with HCCI there is no well-defined combustion initiator that can be directly controlled. Moreover, to achieve dynamic operation with variable work output, the control system must be able to change operating conditions such as compression ratio, inducted gas temperature and pressure, and fuel-air ratio, which can add complexity and cost. To ensure ignition and to avoid cylinder wall wetting by fuel droplet condensation the fuel employed in HCCI should have a relatively low boiling point.

U.S. Pat. No. 5,117,800 describes a method of operating a diesel or spark ignition engine which includes enriching the combustion air supply with oxygen while simultaneously adjusting the fuel injection or ignition timing of the engine to compensate for advanced combustion caused by an increased oxygen content in the combustion air. A turbocharger is used as a pump to separate air through an oxygen-producing membrane. The oxygen-enriched air is at a lower pressure, and hence is cooler, than conventionally turbocharged combustion air, so the need for an intercooler is reduced or eliminated.

U.S. Pat. No. 3,794,007 describes the use of fuel from an engine's fuel supply to heat up combustion air for a cold start. Air in a suction line or intake manifold is heated by burning fuel in a flame-suction-air-heater during startup operation of the engine under load when a poorly-ignitable fuel such as gasoline is used. The engine has a relatively low compression ratio. Burning fuel in this manner reduces fuel efficiency, and the reduction in intake air density lowers overall engine efficiency.

U.S. Pat. No. 4,333,424 discloses an isothermal engine which runs a combustion process requiring a minimum of two cylinders. The engine has a compression cylinder which compresses air for delivery via a heat exchanger to an expansion cylinder. The expansion cylinder receives the compressed air and fuel and, while combustion occurs during a power stroke, the air pressure in the expansion cylinder is reduced to atmospheric and the expansion cylinder drives a crankshaft. The process is isothermal, not adiabatic, so that the internal temperature in the expansion cylinder is kept constant or rises only a small amount during the expansion phase of the power stroke. The extra cylinders promote frictional losses.

The combustion quality of a diesel engine fuel is expressed as a Cetane Number (CN), which is defined as the percentage by volume of normal cetane (n-hexadecane) in a mixture of normal cetane and 1-methyl naphthalene which has the same ignition characteristics (ignition delay) as the test fuel when combusted in a standard engine under specified test conditions. Fuels with high CN values have low ignition delay and are suitable for use in diesel engines. Commercial diesel engine fuels typically have CN values in the range 40-55. Fuels with high CN values are typically unsuitable for Otto-cycle engines, where resistance to autoignition is desirable.

The combustion quality of Otto-cycle engine fuels is expressed as an Octane Number (ON), with high ON fuels being suitable. Typically, high CN fuels have low ON values and vice versa; hence putting diesel engine fuel in a petrol engine (or petrol in a diesel engine) can be an expensive mistake.

Fuels with low or zero cetane numbers include aromatic hydrocarbons such as toluene, and alcohols such as glycerol. Ethanol, for example, has a cetane number of about 8 and methanol has a cetane number of about 3. (M. Murphy, J. Taylor, and R. McCormick. Compendium of Experimental Cetane Numbers Data, National Renewable Energy Laboratory, 2004, NREL/SR-540-36805). The term "very low CN material" is used herein to refer to materials having a cetane number between 0 and 30. Instead of cetane number there could be used other ignition characteristics equivalent to it. Under low cetane number materials we understand combustible materials that are unable to ignite or maintain a stable operation under standard Diesel cycle mode. Very low CN materials are not regarded as suitable for use in diesel engines unless modified by admixing with a higher cetane number fuel or by the addition of cetane improvers such as polynitrate esters and amines. See, for example, U.S. Pat. No. 4,746,326 and WO 85/002194. Cetane improvers are expensive, and polynitrate esters have the drawback of being explosive.

Glycerol is formed industrially in increasing quantities as a by-product in the manufacture of biofuels for diesel engines. It would be advantageous to be able to use it, and other very low CN materials, as a fuel for a diesel engine. However, the use of heavier alcohols as diesel engine fuels is problematic. A recent review, by Mario Pagliaro, Rosaria Ciriminna, Horoshi Kimura, Michele Rossi and Cristina Della Pina From Glycerol to Value-Added Products, *Angew. Chem. Int.* Ed. 2007, 46, 4434-4440 states that glycerol "cannot be added directly to fuel because at high temperatures it polymerizes—and thereby clogs the engine—and it is partly oxidized to toxic acrolein". In a recent review by Thomas Stenhede: Wartsila Green Solutions—Running Large Engines on Alternative Fuels, presented at International Seminar on Gasification, Malmo, Sweden, 10 Oct. 2008, the author summarises the state of the art: "glycerine has very poor ignition and combustion characteristics, [and] does not ignite in a diesel engine." The high viscosity of glycerol requires heating to about 130° C. to match the viscosity for good atomisation of conventional diesel engine fuels. However, this precludes the use of cetane- or ignition-modifying additives, which typically decompose or are unstable below this temperature. For example, the predominant cetane improver 2-ethylhexyl nitrate decomposes at 120° C., which precludes combining the necessary steps of viscosity adjustment and cetane modification. Thus, attempts to date to use glycerol as a diesel engine fuel have proved unsatisfactory.

SUMMARY OF THE INVENTION

Aspects of the invention are specified in the independent claims. Preferred features are specified in the dependent claims.

We have surprisingly found that very low CN materials can be efficiently combusted in a compression ignition engine, without the need for chemical modification or the use of additives, by supplying combustion air to the engine at a temperature substantially above ambient. Gasoline (petrol) can be combusted, and even 1-methylnaphthalene, which has a zero cetane number by definition.

The minimum temperature necessary for ignition and the minimum temperature necessary for stable operation will vary according to the nature of the material and the construction of the engine. A multiple applies which is dependent on the adiabatic efficiency, the gamma factor (the ratio between the specific heat of the gas at constant volume and the specific heat at constant pressure) and the compression ratio. The compression ratio is a particularly important factor as regards the overall thermodynamic efficiency of the engine; however practical limits exist at to the maximum compression ratio that can be employed due to structural constraints, material packaging and frictional losses. Non pressure charged diesel cycle engines tend to be limited at ~22:1 and pressure charged engines ~16:1. Otto cycle engines, due to charge detonation, will normally use a range of compression ratios much lower than for diesel cycle engines in the range of ~8:1-10:1 Higher compression ratios will produce higher temperature increases after adiabatic compression of the combustion air. However the final gas temperature achieved per unit compression ratio increase is relatively low; for example the compression ratio of a given test engine would have to be raised from 22:1 to ~36:1 to attain the same end gas temperature as produced by raising the inlet charge temperature by ~65° C. Calculations suggest that a 1° C. increase in combustion air inlet temperature can produce about a 3° C. or higher temperature increase after compression. Unlike with cold startup systems, the combustion air is maintained at an elevated temperature and preferably pressure-corrected for substantially the entire time that the engine is running, i.e. for substantially the entire engine operation range.

Although some high viscosity materials require to be heated in order to achieve an appropriate viscosity for injection into the engine cylinders, this may be done immediately prior to injection so that the material does not remain at an elevated temperature for long before being combusted. In the case of glycerol, we have found that using the method of the present invention enables clean and efficient combustion without polymerization products clogging the engine.

In the present invention, the combustion air is preferably compressed prior to its supply to the engine cylinders. This increases mass flow and improves efficiency. Increasing the mass flow also has the effect of reducing peak temperatures and pressures, which tends to reduce production of NOx gases. Of course, the combustion air is further compressed in the cylinder, where compression-ignition combustion takes place.

The compression may be readily provided by a turbocharger powered by exhaust gases. The waste heat from the exhaust gas, heat generated by the inherent inefficiency of the turbo compressor or any other method of air heating or combination of heat sources may be used to heat up the combustion air. This approach, with heated compressed combustion air, is the opposite to conventional turbocharged systems, wherein the turbo-pressurised air is cooled down, (inter-/after-cooled), to increase mass flow.

In one embodiment, the oxygen content of the combustion air may be enriched to aid combustion. Oxygen enrichment may optionally be employed in combination with compression of the combustion air.

In broad terms, the invention involves heating combustion air or working fluid to a temperature which enables and/or optimises combustion of fuels outside the balance of properties and conditions of fuel and combustion conventionally known in the art. The invention enables the combustion of very low CN materials in compression ignition engines, which materials have not hitherto been regarded as compression ignition engine fuels.

The term "working fluid" is used herein to denote a fluid (gas or liquid) used as the medium for the transfer of energy from one part of a system to another part. The working fluid could comprise air mixed with a gas or vapour which is combustible or supports combustion.

The invention may in principle be used with solid, liquid or gaseous materials; however, fluid materials are preferred for ease of injection.

EXPERIMENTAL RESULTS

Various very low CN materials were combusted in an experimental apparatus comprising a Lister-Petter direct injection two-cylinder diesel engine and a Lister-Petter 4 cylinder direct injection turbocharged engine. The engines were run at constant power and speed (typical power generation conditions). The compression ratio was 22:1 for the normally aspirated engine and 16:1 for the turbocharged engine.

Combustion was initiated using gas oil as a fuel, followed by switching over to the test material once the engine had warmed up. Dimethyl ether (DME) was used initially to introduce the test material solely to allow variation of inlet air temperature without engine stalling during the investigative phase; the flow of DME was then discontinued and the engine was run solely on the test material. The inlet (combustion) air was heated and the temperature of this air was varied to determine the minimum value at which combustion was stable and the effect of increasing mass flow with falling inlet temperature observable. This test was conducted using the normally aspirated two cylinder engine. Combustion became unstable and failed completely below 90° C. Results for glycerol (98.0% purity purum grade obtained from Sigma Aldrich) are given in Table 1.

In the table: Ex. T=exhaust temperature; Th %=fuel rack (throttle) setting; KW=generated electrical output power; NOx=oxides of nitrogen (ppm); CO=carbon monoxide (ppm); O2 in flue=exhaust gas volumetric % oxygen level; Inj. T=injector 'superheat' temperature; Air T=inlet port air temperature.

TABLE 1

| Ex. T | Th % | RPM | KW | NOx | CO | O2 in flue | Inj. T | Air T |
|---|---|---|---|---|---|---|---|---|
| | Warm up on gas oil | | | | | | | |
| 426 | 26.3 | 2322 | 9.08 | 1383 | 212 | | | 88 |
| | Stop | | | Fit inlet heating | | | | |
| | Start on DME - Feed in Glycerol | | | | | | | |

TABLE 1-continued

| Ex. T | Th % | RPM | KW | NOx | CO | O2 in flue | Inj. T | Air T |
|---|---|---|---|---|---|---|---|---|
| | Injector Heater On | | | | DME OFF | | | |
| 433 | MAX | 2340 | 7.00 | 918 | 781 | 9.3 | 148 | 236 |
| 435 | MAX | 2380 | 7.23 | 883 | 722 | 9.6 | 147 | 184 |
| 420 | MAX | 2374 | 7.15 | 750 | 744 | 9.8 | 144 | 172 |
| 414 | MAX | 2343 | 7.34 | 687 | 925 | 10.0 | 145 | 142 |
| 407 | MAX | 2410 | 7.65 | 606 | 1193 | 10.4 | 144 | 101 |
| 406 | MAX | 2344 | 7.62 | 515 | 1999 | 10.6 | 142 | 91 |

Similar experiments were carried out for various other very low CN materials using the same equipment, critical ignition temperature results for which are summarised in Table 2.

TABLE 2

| Test Material | Critical Temperature/° C. |
|---|---|
| glycerol | 90 |
| methanol | 115 |
| ethanol | 150 |
| butanol | 115 |
| gasoline (petrol) 98 octane, unleaded | 100 |
| toluene | 178 |
| 1-methylnaphthalene | 185 |

The critical temperature values given in Table 2 are the approximate combustion air temperatures below which combustion ceased in the experimental engine. In the case of 1-methylnaphthalene, the critical input air temperature may be a little lower than the quoted 185° C. The engine ran stably at this temperature but began to run badly (misfire) at lower temperatures.

It must be emphasised that the critical temperatures quoted are for the temperature of the combustion air immediately prior to its input to the engine cylinders. The actual temperature of the combustion air after compression in the cylinder, and prior to ignition, will be considerably higher.

Table 3 gives results for combustion of glycerol (98.0% purity) as compared to gas oil in accordance with embodiments of the invention. These experiments were conducted at matched engine speeds and output powers using the 4 cylinder turbocharged engine. The inlet temperature was optimised at around 144 C for this engine type burning glycerol. The correction of air mass flow was made by adjusting the pressure delivered to the inlet manifold in such as way that the volumetric level of oxygen in the exhaust gas was equal in both evaluations. It is also seen that NOx level when the engine is running on glycerol was substantially lower than that on gas oil under normal combustion due to the lower peak combustion temperature. It can be seen that with the port inlet air at around 144° C. and at matched volumetric flue gas oxygen levels the combustion of glycerol in accordance with the embodiments of this invention is more efficient than the combustion of gas oil to specification for this engine type. The efficiency was calculated using timed mass samples and calculating energy conversion by means of the net calorific value of each fuel.

TABLE 3

| Ex. T | Th % | RPM | KW | NOx ppm | CO ppm | O2 in Flue | Air T |
|---|---|---|---|---|---|---|---|
| | | | Switch to Glycerol | | | | |
| 291 | max | 2317 | 15.88 | 311 | 565 | 12.82 | 134.3 |
| 296 | max | 2320 | 15.91 | 352 | 421 | 12.65 | 139.6 |
| 298 | max | 2317 | 15.91 | 373 | 404 | 12.57 | 143.6 |
| 299 | max | 2325 | 15.91 | 383 | 393 | 12.53 | 143.1 |
| 299 | max | 2319 | 15.86 | 388 | 391 | 12.55 | 143.2 |
| 300 | max | 2328 | 15.82 | 392 | 389 | 12.55 | 144.2 |
| 300 | max | 2324 | 15.91 | 398 | 389 | 12.53 | 144.2 |
| | | | | | | Eff. = 29.37% | |
| | | | Switch to Gas Oil | | | | |
| 341 | 26.7 | 2355 | 16.22 | 600 | 201 | 12.48 | 70.4 |
| 342 | 26.4 | 2357 | 16.16 | 592 | 205 | 12.51 | 69.9 |
| 341 | 26.4 | 2339 | 16.01 | 594 | 203 | 12.51 | 70.4 |
| 340 | 26.4 | 2352 | 16.08 | 588 | 200 | 12.55 | 70.5 |
| 339 | 28.7 | 2368 | 16.05 | 581 | 202 | 12.61 | 71.7 |
| | | | | | | Eff. = 28.67% | |

Table 4 gives combustion results for used tire distillate (UTD), another low CN material. Symbols are as for Table 1. Boost Barg=inlet manifold pressure measured in Bar gauge. It is seen that the switching off of the inlet air heaters when the engine is running on UTD results in the engine stalling. Under conditions in accordance with an embodiment of the invention, the CO level in the exhaust drops sharply and combustion runs smoothly. Ignition failed at an air temperature of about 86° C., at which point emissions were extremely high. The best temperature for reduced emissions was about 145° C.

TABLE 4

| Ex. T | Th % | RPM | KW | NOx | CO | FT | O2 in Flue | Inj. T | Boost Barg |
|---|---|---|---|---|---|---|---|---|---|
| | | Warm up on gas oil | | | | | | | |
| 256 | 20.3 | 2327 | 12.62 | 387 | 159 | 24.6 | 15.11 | 83.1 | 1.61 |
| 259 | 20.4 | 2318 | 12.61 | 390 | 158 | 25.7 | 15.04 | 84.7 | 1.61 |
| 261 | 20.4 | 2306 | 12.32 | 396 | 168 | 29.5 | 15.09 | 86.8 | 1.57 |
| | | Inlet heater on | | | | | | | |
| 320 | 21.5 | 2338 | 12.78 | 666 | 183 | 31.1 | 13.45 | 138.8 | 1.47 |
| | Switch to UTD | | | | | | | | |
| 327 | 18.9 | 2325 | 12.53 | 1006 | 246 | 29.4 | 13.49 | 141.1 | 1.43 |
| | Switch off inlet heater | | | | | | | 142.1 | |
| | | | | 895 | 255 | | | 138.2 | |
| | | | | 783 | 327 | | | 121.7 | |
| | | | | 722 | 414 | | | 108.6 | |
| | | | 12.18 | 701 | 516 | | | 101.6 | |
| | | | 12.01 | 663 | 662 | | | 95.3 | |
| | | | 12.15 | 659 | 745 | | | 92.1 | |
| | | Stalled | | | | | | | |
| | | Inlet heaters on/off/on - various | | | | | | | |

TABLE 4-continued

| Ex. T | Th % | RPM | KW | NOx | CO | FT | O2 in Flue | Inj. T | Boost Barg |
|---|---|---|---|---|---|---|---|---|---|
| testing for stall point circa 86° C. | | | | | | | | | |
| Heaters on | | Waste gate normal setting | | | | Fuel = 10.35 kg | | | |
| 320 | 20.3 | 2349 | 13.26 | 1001 | 238 | 33.1 | 13.08 | 145 | 1.46 |
| 341 | 20.4 | 2323 | 13.04 | 1038 | 245 | 33.3 | 12.94 | 151 | 1.45 |
| 340 | 20.4 | 2314 | 12.94 | 993 | 235 | 34.3 | 13.27 | 143 | 1.48 |
| 339 | 20.4 | 2310 | 12.82 | 956 | 253 | 34.9 | 13.31 | 142 | 1.47 |
| 336 | 20.4 | 2323 | 12.89 | 957 | 254 | 35.5 | 13.42 | 141 | 1.49 |
| | | | | | | Fuel = 8.082 kg | | | |

The invention is applicable to the combustion of a wide variety of fuels. Such fuels include hydrocarbon fuels, for example heavy and residual fuels, and renewable vegetable-based fuels or by-products, for example tall oils or animal fats.

Gaseous fuels include fossil gases such as natural gas, and producer gases such as refinery offgases, bio-gases (from landfill or biodigester), pyrolysis gases, mine methane, and hydrogen.

Because such a wide range of materials may be combusted efficiently, the invention may also be used for combustion of suitable waste solvents, for example alcohols, ketones, diols, esters and aromatic solvents. The use of high temperature combustion air, optionally with pressurisation and/or increased partial pressure of oxygen helps ensure complete combustion.

The invention is suitable for application in internal combustion engines such as power generation engines, marine engines, aircraft engines and automotive engines, gas turbines, external combustion engines and or furnace boilers. It is envisaged that the invention may be of particular application in a dual fuel engine, in which combustion may be initiated using a conventional diesel engine fuel, until the engine and the combustion air have sufficiently warmed up, after which the fuel supply may be switched to a very low CN material. The invention is also particularly well suited to engine driven power generation systems and engine driven Combined Heat and Power systems as the majority of the energy used to increase the intake charge temperature is recycled back to the heat recovery system via the engine exhaust. The invention provides benefits over conventional CHP technology. The use of glycerol with cetane improver to enable ignition for example would yield a very low exhaust temperature limiting the quantity of recoverable heat and reducing the CHP efficiency. By adding heat at the inlet the material can be effectively combusted while maintaining a high CHP efficiency.

To aid warming of the engine, hot exhaust gases may be recirculated to the combustion air manifold. Such exhaust gas recirculation (EGR) is known per se for reducing oxygen content of combustion air and reducing NOx emissions. However, the primary purpose of doing this in the present invention is to heat the engine intake charge.

The operator of the engine may manually adjust the process conditions to optimise these for a particular fuel that is being combusted. However, in a preferred embodiment, the engine system will recognise the type of fuel being used, and automatically adjust the combustion conditions for that type of fuel.

While the preferred minimum temperature for the combustion air will differ for different engine types and compression ratios, as well as for different fuels, it is envisaged that this minimum will be not less than 60° C., and will be substantially higher for many very low CN materials. Upper temperature limits are more theoretical than practical, with higher temperatures being more costly to achieve and maintain. Components such as exhaust valves and turbo inlets may be rated only up to a specified temperature, and keeping the temperatures within the operating range for these components will impose a practical upper limit. However the inherent latent heat of vaporisation of many of the fuel types that can be used naturally reduces the peak combustion temperature and allows maximum rated power operation within specified ranges for these components. (See glycerol combustion exhaust temperatures). Without wishing to limit the scope of the invention, it is expected that an upper limit of 250° C. should be sufficient for practical purposes.

The articles 'a' and 'an' are used herein to mean 'at least one' unless the context otherwise requires.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

While the invention has, for purposes of illustration, been described with reference to specific examples, it will be understood that the invention is not limited to those examples. Various alterations, modifications, and/or additions may be introduced into the constructions and arrangements described above without departing from the ambit of the present invention set forth in the claims.

The invention claimed is:

1. A method of igniting and combusting glycerol, the method comprising injecting said glycerol into a combustion cylinder of a heterogeneous-charge compression-ignition engine, and supplying to the cylinder inlet port combustion air at a temperature in the range 60-250° C. for substantially the entire time that the engine is running.

2. A method according to claim 1, wherein the combustion air is supplied to the cylinder inlet port at a pressure such that mass flow entering the cylinder via the inlet port is corrected to substantially equal that that would enter the cylinder under standard operating conditions.

3. A method according to claim 1, further comprising heating said glycerol prior to injecting it into the combustion chamber.

4. A method according to claim 1, wherein at least some of the combustion air is heated using waste heat from the engine.

5. A method according to claim 1, wherein the combustion air is pressurised by means of a turbo-charger driven by the flow of exhaust gas from the engine.

6. A method according to claim 5, wherein at least part of the combustion air is heated by the inherent inefficiency of the turbo charger driven by the flow of the exhaust gas from the engine.

7. A method according to claim 1, wherein the combustion air has an enriched oxygen content.

8. A method according to claim 1, further comprising generating combined heat and power (CHP) and using heat recycled from the inlet air to maintain or increase the usable exhaust gas waste heat energy for recovery.

9. A method of igniting and combusting glycerol, the method comprising injecting said glycerol into a combustion cylinder of a heterogeneous-charge compression-ignition engine, and supplying to the cylinder inlet port combustion air at a temperature of at least 60° C. for substantially the entire time that the engine is running.

10. A method according to claim 9, wherein the glycerol is heated and injected into the cylinder at a temperature in the range 60-160° C.

11. A method of generating combined heat and power (CHP), including igniting and combusting glycerol according to the method of claim 9 and using heat recycled from the inlet air to maintain or increase the usable exhaust gas waste heat energy for recovery.

* * * * *